(12) United States Patent
Brown

(10) Patent No.: US 7,631,811 B1
(45) Date of Patent: Dec. 15, 2009

(54) OPTICAL HEADSET USER INTERFACE

(75) Inventor: William Owen Brown, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 103 days.

(21) Appl. No.: 11/906,803

(22) Filed: Oct. 4, 2007

(51) Int. Cl.
*G06K 7/14* (2006.01)

(52) U.S. Cl. ............... 235/454; 379/428.02; 455/73

(58) Field of Classification Search ......... 235/454; 379/428.02
See application file for complete search history.

(56) References Cited

U.S. PATENT DOCUMENTS

| | | | |
|---|---|---|---|
| 6,980,673 B2* | 12/2005 | Funahashi | 382/124 |
| 2001/0017934 A1* | 8/2001 | Paloniemi et al. | 382/107 |
| 2007/0274530 A1* | 11/2007 | Buil et al. | 381/74 |
| 2008/0130910 A1 | 6/2008 | Jobling et al. | |
| 2008/0284734 A1* | 11/2008 | Visser | 345/166 |

OTHER PUBLICATIONS

Gregory, Peter; Doria, Tom; Stegh, Chris; Su, Jim; SIP Communications For Dummies, Avaya Custom Edition, 2006, Wiley Publishing, Inc., Hoboken, NJ, USA.

\* cited by examiner

*Primary Examiner*—Daniel A Hess
*Assistant Examiner*—Laura Gudorf
(74) *Attorney, Agent, or Firm*—Intellectual Property Law Office of Thomas Chuang

(57) ABSTRACT

A headset includes a finger pad on an exterior of the headset on which a finger of a headset wearer is placed. The headset includes an optical line scanner which scans the finger pad and outputs a series of successive images of the finger placed on the finger pad. A headset processor processes the output of the optical line scanner to detect relative motion of the finger on the finger pad or detect tapping of the finger on the finger pad.

20 Claims, 5 Drawing Sheets

Line Scanner for Scrolling

Line Scanner for Selecting

OPTICAL HEADSET USER INTERFACE

BACKGROUND OF THE INVENTION

Recent developments in the telecommunications industries have produced telecommunications devices with increased capabilities. As a result, the complexity of interacting with these devices has increased. Headsets are now capable of doing more than being simple peripherals to legacy phones. For example, the headsets may control navigation through menus or files.

However, headset form factors do not lend themselves well to traditional user interface technologies like keypads and displays which are suited for complex user man-machine interface interactions. For example, the available space on the headset housing is limited. In the prior art, headset user interfaces typically consist of a small number of multifunction buttons and a multifunction visual indicator. This limited user interface makes access to more complex features and capabilities difficult and non-intuitive, particularly when the headset is being worn. Visual indicators have limited use while the headset is being worn. Multifunction buttons are non-intuitive and awkward to use.

As headsets become more "intelligent", they offer advanced features and functionality. With increased features and functionality, these headsets require more complex user interfaces. However, the limited physical size of headset housings makes it desirable to minimize the number of or required size of the headset user interface mechanisms.

As a result, there is a need for improved methods and apparatuses for headset user interface input mechanisms.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
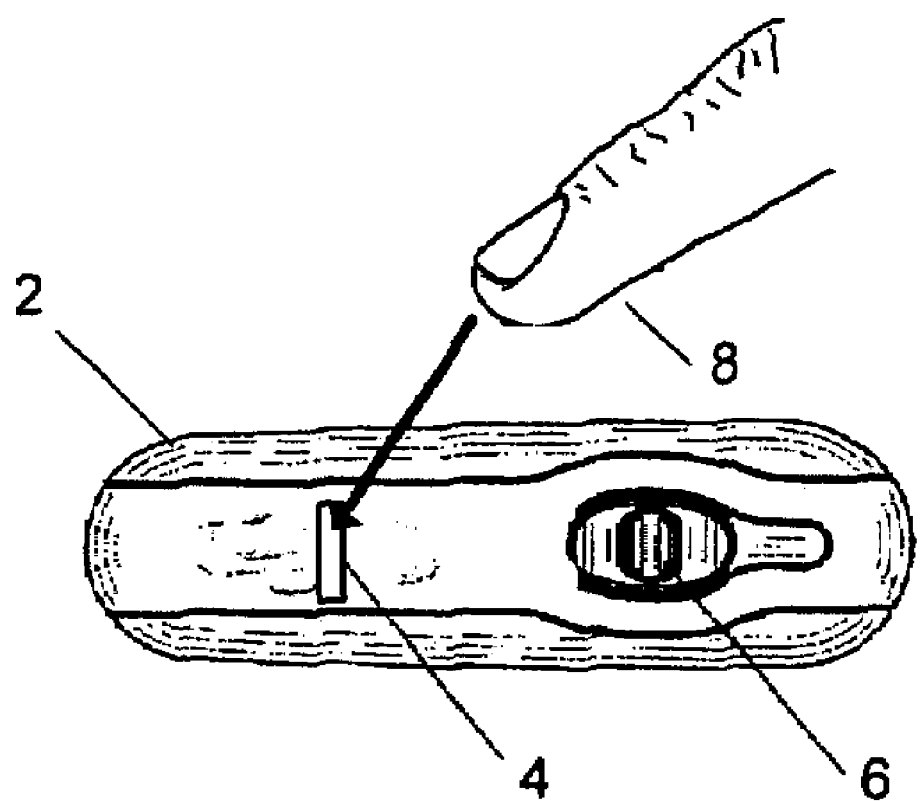
FIG. 1 illustrates a headset capable of receiving user inputs utilizing an optical line scanner.

Methods and apparatuses for a headset user interface is disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates generally to the field of headset user interfaces and specifically to the field of headset user interface input mechanisms. In one example, this description describes a method and apparatus for a headset with an optical line scanner on a lightweight headset, where the optical line scanner detects finger movements, such as tapping, sliding forward and sliding backward to be translated into various inputs, such as volume up and down, menu scrolling, and other headset user interface options known in the art.

As a user moves his or her finger moves across the line scanner, relative motion of the fingerprints ridges and valleys are scanned. In the same manner that an optical mouse interprets the changing images to detect movement of the mouse, motion of the user finger is determined. However, for a headset user interface, only one axis is needed for scrolling, allowing the possibility of using a line scanner. For tapping, an algorithm is used to determine the amount of light being received by the optoelectronic sensor. In a further example, to reduce false triggers, such as due to hair falling in front of the sensor, secondary mechanisms are used such as overlaying a transparent touch sensor such as a capacitance sensor on the line scanner pad.

In one example of the invention, a headset includes a microphone, a speaker, and a finger pad on an exterior of the headset on which a finger of a headset wearer is placed. The headset includes an optical line scanner which scans the finger pad and outputs a series of successive images of the finger placed on the finger pad. A headset processor processes the output of the optical line scanner to detect relative motion of the finger on the finger pad or detect tapping of the finger on the finger pad. The optical line scanner may include a light source, an optical guide for forming a line of light from the light source, an imaging sensor, and a lens for directing the line of light reflected from the finger pad onto the imaging sensor.

In one example of the invention, a headset includes a finger receiving means for placement of a user finger, and an optical line scanning means for scanning the finger receiving means on a headset housing exterior and providing an output of successive images of the finger receiving means. The processing means processes the output of successive images on the finger pad to determine a relative movement of a user finger across the finger pad or to determine a tapping of the user finger on the finger pad. The processing means modifies a headset control operation responsive to the relative movement of the user finger or the tapping.

In one example of the invention, a method for receiving user input at a headset includes providing a transparent finger pad on a headset housing for receiving a user finger, providing an optical line scanner disposed within the headset housing, and scanning the transparent finger pad with the optical line scanner to output a series of successive images. The method further includes processing the successive images to determine a relative movement of a user finger across the finger pad, and modifying a headset control operation responsive to the relative movement of the user finger.

In one example of the invention, a headset includes a finger receiving means for placement of a user finger, and an optical scanning means for scanning the finger receiving means on a headset housing exterior and providing a sequence of electrical signals associated with successive line scan images of the finger receiving means. The headset further includes a processing means for processing the sequence of electrical signals to determine a relative bi-directional movement of a user finger across the finger pad along a single axis or determine a tapping of the user finger on the finger pad. The processing means modifies a headset control operation responsive to the relative movement of the user finger or the tapping.

In one example of the invention, a method for receiving user input at a headset includes providing a transparent finger pad on a headset housing for receiving a user finger, providing an optical line scanner disposed within the headset housing, and scanning the transparent finger pad with the optical line scanner to output a sequence of electrical signals associated with successive line scan images. The sequence of electrical signals is processed to determine a relative movement of a user finger across the finger pad. The headset control operation is modified responsive to the relative movement of the user finger.

FIG. 1 illustrates a headset 2 capable of receiving user inputs utilizing an optical line scanner. Headset 2 includes a narrow finger pad 4 serving as a scanning surface on which a user finger is placed and scanned by the user "wiping" his finger across the scanning surface. During optical scanning, the user slides his or her finger across the scanning surface, whereby the line scanner images the finger line by line as it is slid across the scanning surface.

Figure 2:
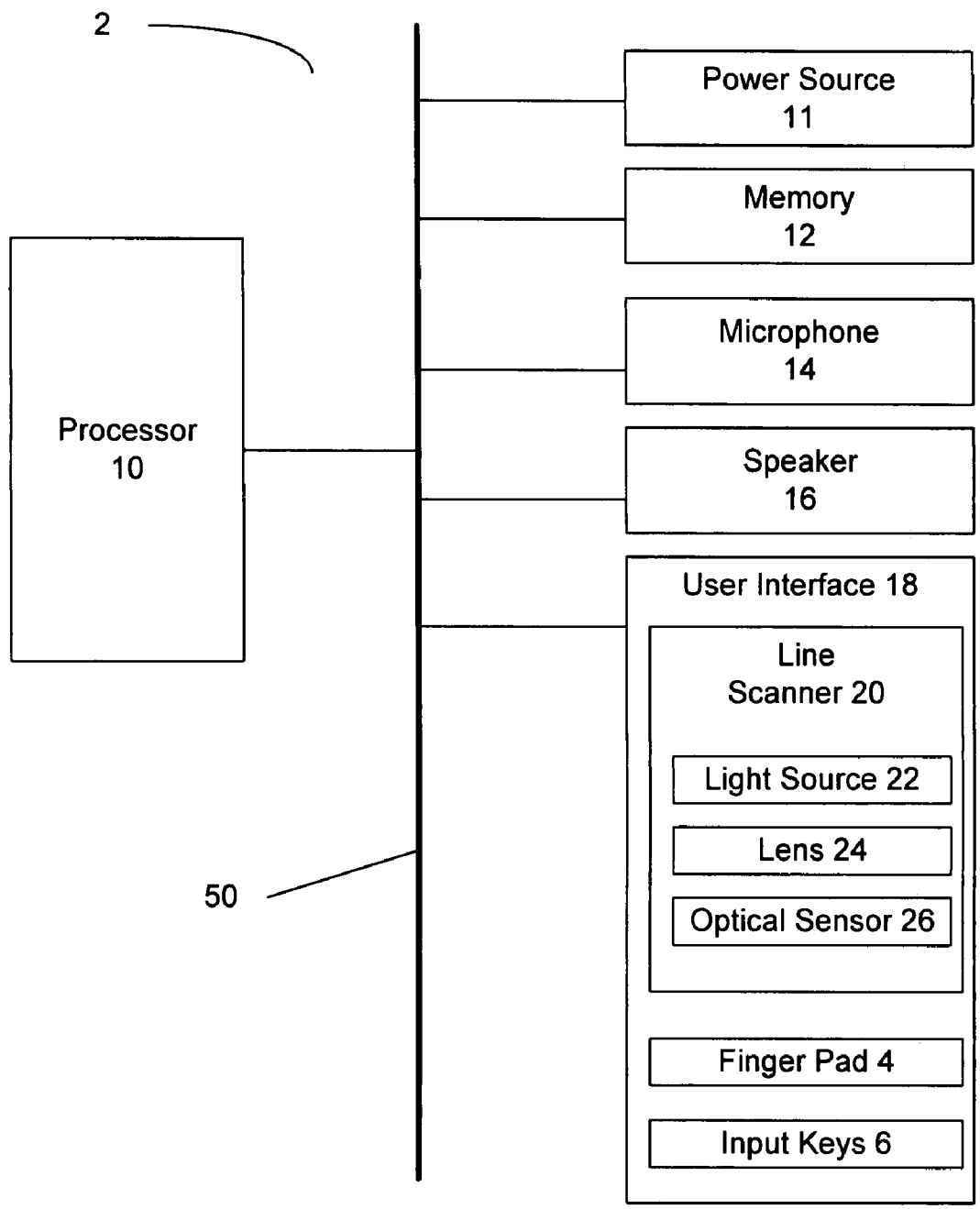
FIG. 2 illustrates a simplified block diagram of the components of the headset shown in FIG. 1.

FIG. 2 illustrates a simplified block diagram of the components of the headset 2 shown in FIG. 1. The headset 2 includes a processor 10 operably coupled via a bus 50 to a memory 12, a microphone 14, power source 11, and user interface 18. User interface 18 includes a line scanner 20 and, optionally, one or more input buttons or keys 6. In one example, line scanner 20 includes a light source 22, lens 24, and optical sensor 26. Optical sensor 26 is, for example, a charge coupled device (CCD) such as a CMOS square pixel array. The CCD is an array of light sensitive diodes which generate an electrical signal in response to light which hits a particular pixel. Line scanner 20 may also include a processor for processing scan data. Alternatively, line scanner 20 may utilize processor 10 to process scan data. Line scanner 20 may also include memory separate from memory 12 for storing scan data or firmware/software executable to operate line scanner 20 and process scan data. The firmware/software may include a user input identifier application for analyzing scanned finger motion data to determine user input at the finger pad 4. Alternatively, line scanner 20 may utilize memory 12 for such purposes. The line scanner 20 is properly aligned and integrated with finger pad 4 within the headset housing. In a further example, line scanner 20 is replaced with an alternative optical scanner. Examples of optical scanners include, without limitation, image sensors, planar scanners, CMOS sensors, contact image sensors, or other optical systems such as used by optical mouse devices.

Memory 12 may include a variety of memories, and in one example includes SDRM, ROM, flash memory, or a combination thereof. Memory 12 may further include separate memory structures or a single integrated memory structure. In one example, memory 12 may be used to store passwords, network and telecommunications programs, and/or an operating system (OS).

Processor 10, using executable code and applications stored in memory, performs the necessary functions associated with headset operation described herein. Processor 10 allows for processing data, in particular managing data between user interface 18 and operation of headset 2 functions. In one example, processor 10 is a high performance, highly integrated, and highly flexible system-on-chip (SOC), including signal processing functionality such as echo cancellation/reduction and gain control in another example. Processor 10 may include a variety of processors (e.g., digital signal processors), with conventional CPUs being applicable.

In one example the line scanner 20 continuously monitors finger pad 4 to identify whether a user has placed a finger on finger pad 4 to perform an input action. User interface 18 allows for manual communication between the headset user and the headset. User interface 18 may also include, for example, an audio and/or visual interface such that an audio prompt may be provided to the user's ear and/or an LED may be lit. For example, the prompt may inform the user to place his or her finger on the finger pad to perform a fingerprint scan. Although illustrated in FIG. 2 as separate from line scanner 20, finger pad 4 may also be considered to be a component of line scanner 20.

Figure 3:
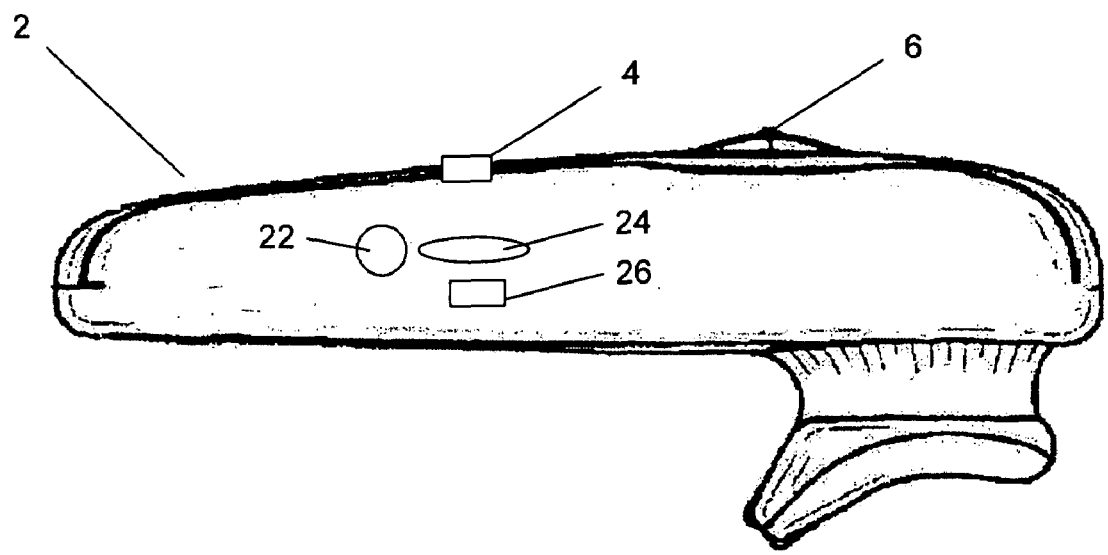
FIG. 3 illustrates a side view of a headset showing the internal arrangement of a line scanner system.

FIG. 3 illustrates a side view of the headset 2 showing the internal arrangement of the line scanner system. The housing body of headset 2 includes a finger pad 4. Headset 2 may also include one or more user interface buttons or keys 6 which the user may depress.

The finger pad 4 is optically transparent, allowing light from a light source 22 disposed within the headset housing to exit the headset. For example, finger pad 4 is a planar surface composed of glass or plastic. After light from the light source 22 is reflected off the finger pad 4, it re-enters the headset housing and is focused by a lens 24 on an optical sensor 26. For example, optical sensor 26 is a motion sensor integrated circuit (IC) having an array of photodetectors for capturing an image. Optical sensor 26 converts light information into an electrical signal and transmits the signal to a system image processing unit. Lens 24 and optical motion sensor 26 are disposed within the headset 2. An optical guide may be arranged to convert light from light source 22 into a line-shaped light to illuminate a fingerprint in a line-shape. In a further example, a scanning component may sweep a beam spot of light across the finger pad 4 and the optical sensor may be a single element.

The light reflected off the finger pad 4 forms an image of a user finger placed on the finger pad 4 on optical sensor 26. This image is captured by optical sensor 26. For example, optical sensor 26 has a plurality of line-shaped photoelectric converting elements. Successive images of a finger placed on the finger pad 4 are then compared by a processor. The processor may be integrated with the optical sensor 26 or may be a separate processor such as the headset processor 10. The successive images are compared to determine the forward or backward motion of the user finger across finger pad 4. The successive images are also compared to determine whether the user is "tapping" or "double tapping" the finger pad 4, i.e., quickly placing his finger tip on finger pad 4 and then removing it. Depending on the current operational state of the headset, the forward or backward motion is translated to a predefined user input, such as scrolling through a menu or volume increase or decrease. User tapping or double tapping is translated, for example, to a user selected command.

The directional motion of a finger on finger pad 4 along a single axis (e.g., X or Y) or the presence of a finger on finger pad 4 is detected optically by optical sensor 26 by directly imaging, as an array of pixels, the various particular ridges and valleys of the user fingerprint placed on the finger pad 4. The particular features of the fingerprint are illuminated by the light source 22. The use of optical sensors to detect direction and degree of movement along an X-Y coordinate system is described in U.S. Pat. No. 6,233,368 issued May 15, 2001, entitled "CMOS Digital Optical Navigation Chip", which is hereby incorporated by reference for all purposes.

Figure 4A:
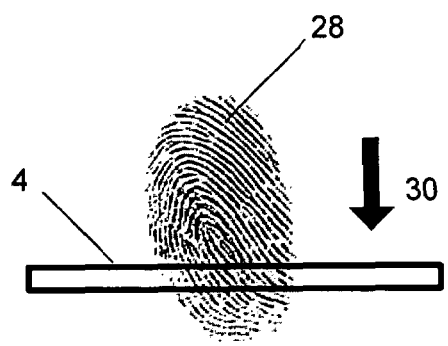
FIGS. 4A-4D illustrate sample operation of a line scanner to detect user input scrolling as the user "wipes" his finger.
Figure 4B:
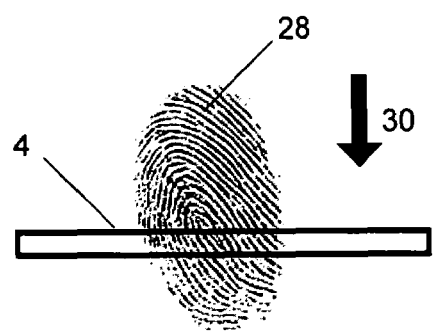
Figure 4C:
Figure 4D:

The motion of a finger on finger pad 4 is detected by optical sensor 26 by comparing a newly captured image with a previously captured image to ascertain the direction and amount of movement. The newly captured image and previously captured images may be stored in memory on the optical sensor 26 or stored in headset memory 12. For example, referring to FIGS. 4A-4C, sample operation of line scanner 20 to detect user input scrolling as the user "wipes" his finger in a direction 30 is illustrated. FIG. 4A illustrates a fingerprint 28 corresponding to a user finger placed on finger pad 4. Referring to FIG. 4C, a fingerprint portion 32 scanned by line scanner 20 is captured. At an immediate point in time thereafter as the user finger is wiped in direction 30, the fingerprint 28 is at a second position on finger pad 4, as shown in FIG. 4B. As a result, a different fingerprint portion 34 scanned by line scanner 20 is captured, as shown in FIG. FIG. 4D. The image of fingerprint portion 32 is compared to the image of fingerprint portion 34 to ascertain the direction of movement of the user finger across finger pad 4. For example, the ridges and valleys of the fingerprint line scans may be pattern matched and aligned to determine the direction of movement.

Figure 5A:
FIGS. 5A-5C illustrate sample operation of a line scanner to detect user input tapping.
Figure 5B:
Figure 5C:

For example, referring to FIGS. 5A-5C, sample operation of line scanner 20 to detect user input tapping is illustrated. In this example, line scanner 20 detects user tapping by determining whether the user has placed his finger across finger pad 4 and removed it immediately thereafter. For example, at a first time shown in FIG. 5A, the user finger pad 4 does not have a finger placed upon it. At a second time shown in FIG. 5B, the user has placed his finger upon finger pad 4, which is scanned by line scanner 20. At third time illustrated in FIG. 5C, the finger pad 4 is once again clear as the user has removed his finger. In one example, the quantity of light detected by the sensor is used to determine a tap. In a further example, a time period on which the user finger is placed on finger pad 4 to indicate a user tap is empirically determined. Double tapping is detected, for example, by detecting user tapping twice within a predefined time period.

The information developed by optical sensor 26 regarding the motion of the user finger on the finger pad 4 is relayed to the headset processor 10, which translates the information to correspond to user input actions at the headset. The headset processor 10 then implements the desired input action. For example, such desired input actions may include volume control, power control, call answer, call terminate, item select, next item, and previous item, or other actions typically performed at a headset device.

In a further example, line scanner 20 is used to authenticate the identity of the headset user by scanning the fingerprint of the user and comparing it to a previously stored authorized fingerprint. During optical scanning, the user slides his or her finger across the scanning surface, whereby the line scanner images the finger line by line as it is slid across the scanning surface. In this manner, the fingerprint of the user is generated. In this example, the headset memory includes previously stored fingerprint data corresponding to validated users, a feature identifier application for analyzing scanned fingerprint scan data, and a fingerprint match application for comparing the analyzed scanned fingerprint scan data to previously stored fingerprint data. In one example, headset user authentication is required prior to allowing the user to operate the headset. In this example, the line scanner 20 serves the dual function of being a user interface input device and an authentication device.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the methods and systems described herein may be applied to other body worn devices in addition to headsets. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A headset comprising:
    a microphone;
    a speaker;
    a finger pad on an exterior of the headset on which a finger of a headset wearer is placed;
    an optical line scanner, wherein the optical line scanner scans the finger pad and outputs a series of successive images of the finger placed on the finger pad; and
    a processor, wherein the processor processes the series of successive images to detect relative motion of the finger on the finger pad or detect tapping of the finger on the finger pad.

2. The headset of claim 1, wherein the optical line scanner comprises:
    a light source;
    an optical guide for forming a line of light from the light source an imaging sensor; and
    a lens for directing the line of light reflected from the finger pad onto the imaging sensor.

3. The headset of claim 2, wherein the light source comprises a light emitting diode.

4. The headset of claim 2, wherein the imaging sensor comprises an integrated circuit sensor.

5. The headset of claim 1, wherein the optical line scanner detects relative motion of the finger on the finger pad along a single axis.

6. The headset of claim 1, wherein the finger pad comprises a glass planar surface.

7. A headset comprising:
    a finger receiving means for placement of a user finger;
    an optical line scanning means for scanning the finger receiving means on a headset housing exterior and providing an output of successive images of the finger receiving means;
    a capacitive sensing means overlaid on the finger receiving means for sensing placement of a user finger to detect a false trigger of the optical line scanning means; and
    a processing means for processing the output of successive images of the finger receiving means to determine a relative movement of a user finger across the finger receiving means or determine a tapping of the user finger on the finger receiving means, wherein the processing means modifies a headset control operation responsive to the relative movement of the user finger or the tapping;
    a first transducer means for receiving a user speech signal; and
    a second transducer means for outputting an audio signal.

8. The headset of claim 7, wherein the headset control operation comprises one or more selected from the following group: volume control, power control, call answer, call terminate, item select, next item, and previous item.

9. A method for receiving user input at a headset comprising:
- providing a transparent finger pad on a headset housing for receiving a user finger;
- providing an optical line scanner disposed within the headset housing;
- scanning the transparent finger pad with the optical line scanner to output a series of successive images;
- processing the series of successive images to determine a relative movement of a user finger across the transparent finger pad; and
- modifying a headset control operation responsive to the relative movement of the user finger.

10. The method of claim 9, wherein processing the successive images to determine a relative movement of a user finger across the finger pad comprising determining whether the user finger is moving in a first direction along an axis or in a second direction opposite the first direction along the axis.

11. The method of claim 9, further comprising processing the successive images to determine a tap of the user finger on the finger pad.

12. The method of claim 11, wherein processing the successive images to determine a tap of the user finger on the finger pad comprises measuring a quantity of light received at the optical line scanner.

13. The method of claim 9, wherein processing the successive images comprises identifying and comparing fingerprint ridges and valleys.

14. A headset comprising:
- a finger receiving means for placement of a user finger;
- an optical scanning means for scanning the finger receiving means on a headset housing exterior and providing a sequence of electrical signals associated with successive line scan images of the finger receiving means;
- a capacitive sensing means overlaid on the finger receiving means for sensing placement of a user finger to detect a false trigger of the optical line scanning means; and
- a processing means for processing the sequence of electrical signals to determine a relative bi-directional movement of a user finger across the finger receiving means along a single axis or determine a tapping of the user finger on the finger receiving means, wherein the processing means modifies a headset control operation responsive to the relative bi-directional movement of the user finger or the tapping;
- a first transducer means for receiving user speech; and
- a second transducer means for outputting an audio signal.

15. The headset of claim 14, wherein the headset control operation comprises one or more selected from the following group: volume control, power control, call answer, call terminate, item select, next item, and previous item.

16. A method for receiving user input at a headset comprising:
- providing a transparent finger pad on a headset housing for receiving a user finger;
- providing an optical line scanner disposed within the headset housing;
- scanning the transparent finger pad with the optical line scanner to output a sequence of electrical signals associated with successive line scan images;
- processing the sequence of electrical signals to determine a relative movement of a user finger across the transparent finger pad; and
- modifying a headset control operation responsive to the relative movement of the user finger.

17. The method of claim 16, wherein processing the sequence of electrical signals comprises pattern matching fingerprint ridges and valleys.

18. The method of claim 16, wherein processing the sequence of electrical signals to determine a relative movement of a user finger across the finger pad comprising determining whether the user finger is moving in a first direction along an axis or in a second direction opposite the first direction along the axis.

19. The method of claim 16, further comprising processing the sequence of electrical signals to determine a tap of the user finger on the finger pad.

20. The method of claim 19, wherein processing the sequence of electrical signals to determine a tap of the user finger on the finger pad comprises measuring a quantity of light received at the optical line scanner.

* * * * *